US008550386B2

(12) United States Patent
Topolkaraev et al.

(10) Patent No.: US 8,550,386 B2
(45) Date of Patent: Oct. 8, 2013

(54) OIL ABSORBING MATERIAL AND PROCESSES OF RECYCLING ABSORBENT ARTICLES TO PRODUCE THE SAME

(75) Inventors: Vasily A. Topolkaraev, Appleton, WI (US); Ryan J. McEneany, Appleton, WA (US); Neil T. Scholl, Neenah, WI (US); Tom Eby, Greenville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 421 days.

(21) Appl. No.: 12/976,424

(22) Filed: Dec. 22, 2010

(65) Prior Publication Data

US 2012/0165187 A1    Jun. 28, 2012

(51) Int. Cl.
*B02C 19/00*  (2006.01)
(52) U.S. Cl.
USPC .................................. 241/23; 241/29
(58) Field of Classification Search
USPC .......... 241/23, 29, 260.1, 24.19, 24.18, 24.29
See application file for complete search history.

(56) References Cited

U.S. PATENT DOCUMENTS

| 4,000,860 | A |   | 1/1977  | Gotham          |
|-----------|---|---|---------|-----------------|
| 4,250,222 | A |   | 2/1981  | Mavel et al.    |
| 4,284,247 | A | * | 8/1981  | Eriksson ............... 241/260.1 |
| 4,932,595 | A |   | 6/1990  | Cohen et al.    |
| 4,968,463 | A |   | 11/1990 | Levasseur       |
| 5,330,957 | A |   | 7/1994  | Duquenne        |
| 5,441,801 | A |   | 8/1995  | Deaner et al.   |
| 5,486,553 | A |   | 1/1996  | Deaner et al.   |
| 5,814,673 | A |   | 9/1998  | Khait           |
| 5,914,353 | A |   | 6/1999  | Grizzle et al.  |
| 6,271,270 | B1 |  | 8/2001  | Muzzy et al.    |
| 6,431,477 | B1 |  | 8/2002  | Pallmann        |
| 6,479,003 | B1 |  | 11/2002 | Furgiuele et al. |
| 6,494,390 | B1 |  | 12/2002 | Khait et al.    |
| 6,498,205 | B1 |  | 12/2002 | Zehner          |
| 6,632,863 | B2 |  | 10/2003 | Hutchison et al. |

(Continued)

FOREIGN PATENT DOCUMENTS

| EP | 1209213 A1 | 5/2002 |
| WO | WO 03/030795 A2 | 4/2003 |
| WO | WO 03/030795 A3 | 7/2003 |
| WO | WO 2008/027325 A1 | 3/2008 |

OTHER PUBLICATIONS

Search Report and Written Opinion for PCT/IB2011/055128 dated Jun. 1, 2012, 11 pages.

(Continued)

*Primary Examiner* — Mark Rosenbaum
(74) *Attorney, Agent, or Firm* — Dority & Manning, P.A.

(57) ABSTRACT

An oil absorbing material is generally provided. The oil absorbing material can includes sorbent particles having an average aspect ratio of about 5 to about 500 and a mean average particle diameter of about 10 μm to about 1 millimeter. The oil absorbing material comprises polypropylene, polyethylene, inorganic filler particles, and absorbent core material. In one embodiment, the sorbent particles can have an average specific surface area of about 0.25 to about 5.0 $m^2/g$ and can have a bulk density that is about 0.01 $g/cm^3$ to about 0.8 $g/cm^3$.
Processes of making the oil absorbing material are also provided via a solid-state shear pulverization recycling process transforming absorbent article waste into the oil absorbing material. The process can include pulverizing the absorbent article waste to form sorbent particles while cooling the absorbent article waste in an amount sufficient to maintain the absorbent article waste in a solid state.

13 Claims, 3 Drawing Sheets

(56) References Cited

U.S. PATENT DOCUMENTS

| | | |
|---|---|---|
| 6,802,353 B2 | 10/2004 | Malakouti et al. |
| 6,818,173 B1 | 11/2004 | Khait |
| 6,837,453 B2 | 1/2005 | Sturm |
| 6,880,772 B2 | 4/2005 | Schlesiger et al. |
| 7,168,640 B2 | 1/2007 | Lipowski |
| 7,311,511 B2 | 12/2007 | Pallmann |
| 7,467,585 B2 | 12/2008 | Pallmann |
| 7,510,133 B2 | 3/2009 | Pallmann |
| 7,514,025 B2 | 4/2009 | Hofmann et al. |
| 7,560,414 B2 | 7/2009 | Schmitt et al. |
| 7,816,431 B2 | 10/2010 | Heath et al. |
| 7,842,221 B2 * | 11/2010 | Magni et al. .................. 264/322 |
| 2001/0003797 A1 | 6/2001 | Guevara et al. |
| 2003/0100634 A1 | 5/2003 | Heath et al. |
| 2005/0153123 A1 | 7/2005 | Herfert et al. |
| 2006/0178465 A9 | 8/2006 | Torkelson et al. |
| 2007/0161719 A1 | 7/2007 | Rauh |
| 2008/0022940 A1 | 1/2008 | Kirsch et al. |
| 2008/0128933 A1 | 6/2008 | Przybylinski et al. |
| 2009/0326082 A1 | 12/2009 | Cernohous |
| 2012/0292566 A1 * | 11/2012 | Tian et al. ..................... 252/194 |

OTHER PUBLICATIONS

Article—Albin J. Friedrich, "Size reduction overview: Shear, compression, and impact," *Powder and Bulk Engineering*, Jun. 2001, pp. 19-25.

* cited by examiner

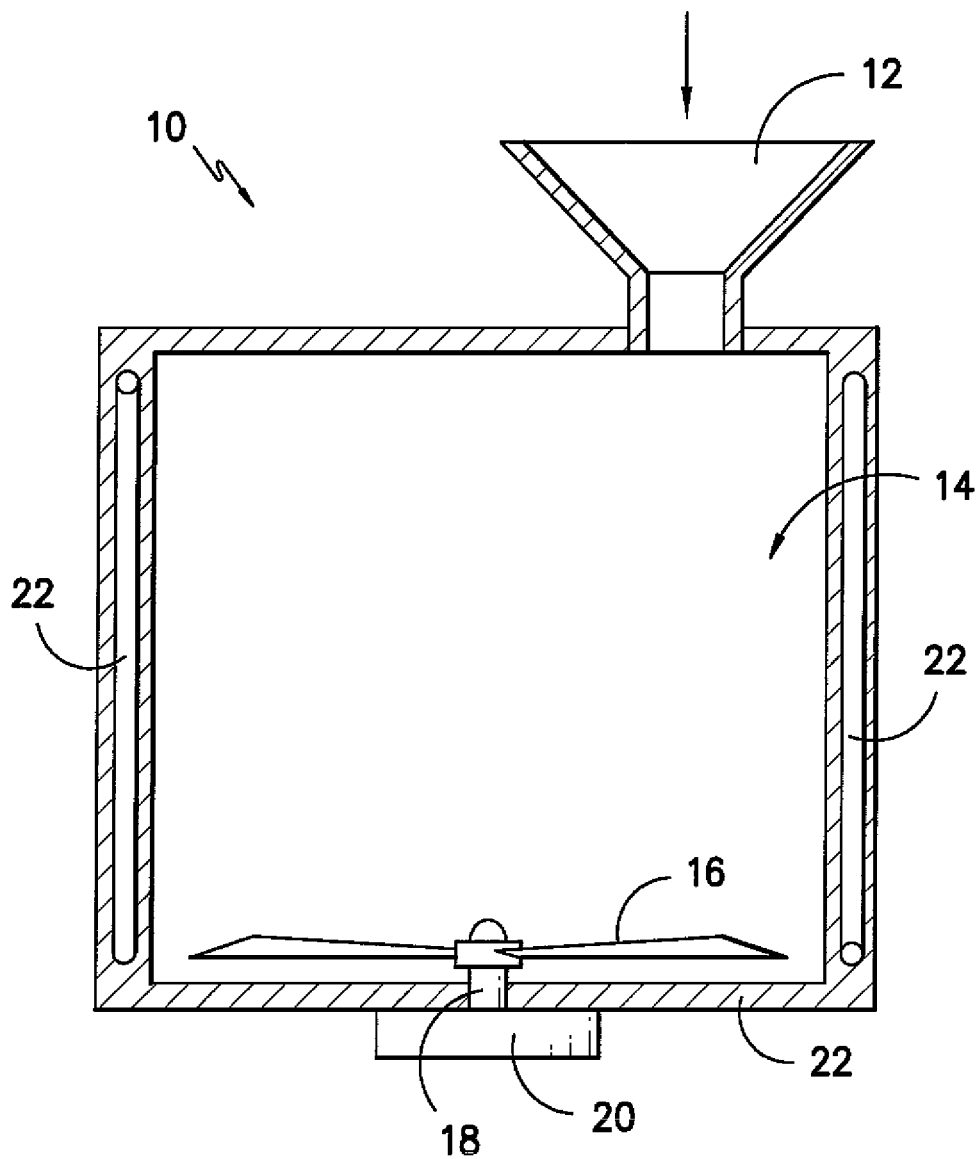
FIG. -1-

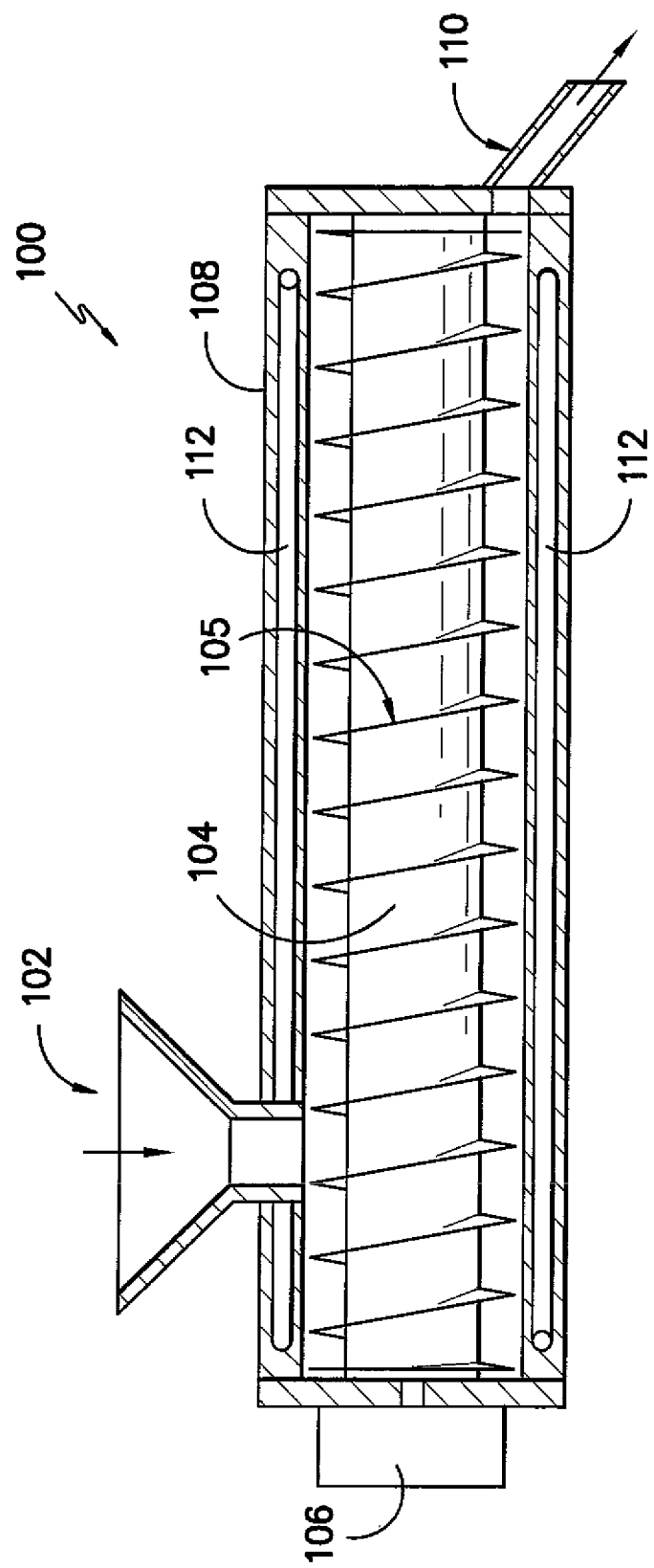
FIG. -2-

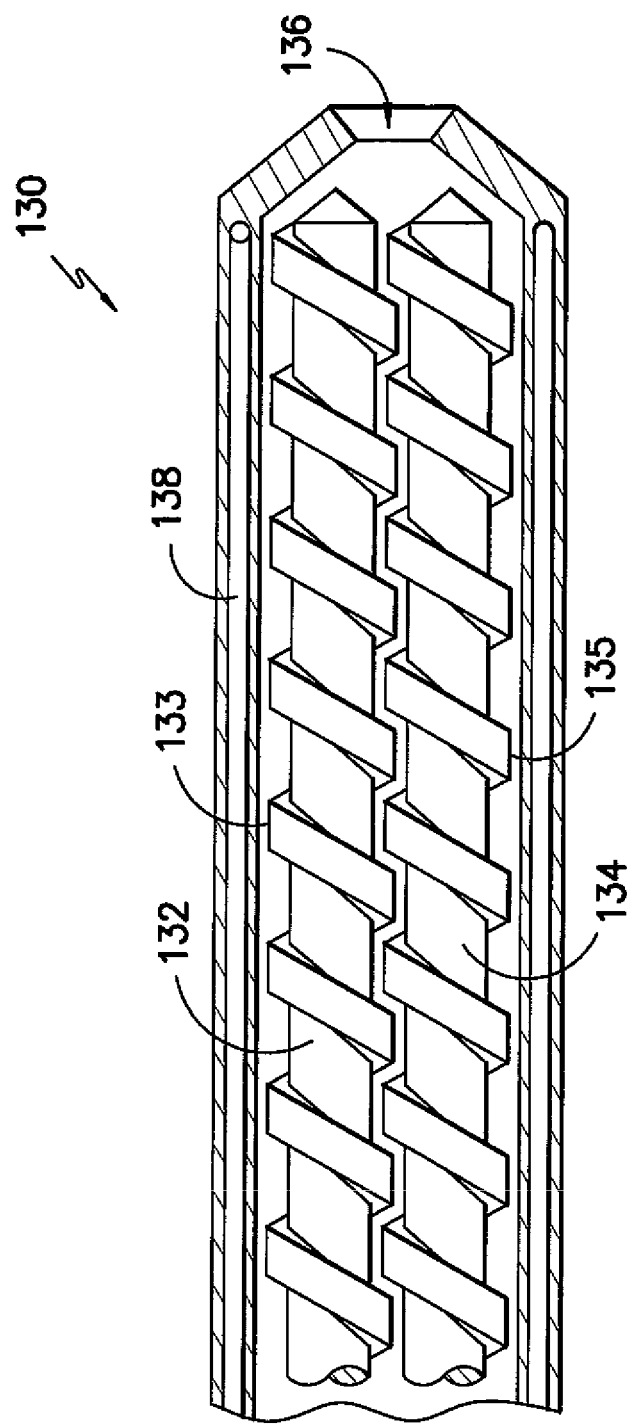
FIG. -3-

OIL ABSORBING MATERIAL AND PROCESSES OF RECYCLING ABSORBENT ARTICLES TO PRODUCE THE SAME

BACKGROUND OF THE INVENTION

Demand for oil absorbing materials designed for targeted applications is continuously growing due to heavy reliance in developed and developing economies on oil and oil based products. During the production and transport of oil, accidental or intentional spills occur in water or on land, creating numerous environmental and health hazard problems for many years. Even though no single system is likely to be completely effective, the use of oil sorbents is one of the most widely used methods for containing and combating oil spills, especially spills that occur in the sea. The controlling mechanisms of oil sorption by the sorbents could be absorption by a polymer or resin, adsorption at interfaces and in void spaces, capillary action at interfaces and surfaces, or some combination of these. Polypropylene fibers and nonwovens are one of the most commonly used sorbents in oil spill cleanup because of its oleophilic and hydrophobic characteristics.

It is greatly desired that these sorbent materials be produced from non-virgin, recycled materials. For example, processes for producing absorbent articles (e.g., diapers) produces thousands of metric tons of manufacturing waste per year. Not only does this manufacturing waste substantially increase the costs of producing the absorbent articles, but the waste also negatively impacts the environment as it is typically disposed of in landfills and other waste collection areas. In addition to the manufacturing waste generated during their production, many absorbent articles are intended for single use as a disposable product. Thus, the use of such disposable products creates an additional waste stream that is added to those landfills.

Absorbent article waste contains a significant amount of polyolefin (e.g., polypropylene and/or polyethylene) fibers and nonwovens that could be used for oil sorption applications. However, baled article waste and/or article tailings waste is not useful for this application due to its physical form and relatively high percentage of unrecovered active superabsorbent material (SAM) and cellulose materials that create significant challenges for use as oil absorption materials due to their high absorbency of water. Separation of the materials of absorbent article manufacturing wastes and soiled absorbent articles presents a unique challenge due to the various compositions that are difficult and costly to separate into individual components. In particular, absorbent articles can include thermoplastic materials (e.g., polyolefins), cellulosic materials (e.g., pulp fibers), super absorbent materials, adhesives, binders, and other natural and synthetic materials. Soiled absorbent articles present an even greater challenge for recycling due to the presence of various bodily wastes within the article.

Accordingly, there exists a need for a recycling process that provides a useful product generated from manufacturing wastes and/or soiled absorbent articles.

SUMMARY OF THE INVENTION

An oil absorbing material is generally provided. The oil absorbing material generally includes sorbent particles having an average aspect ratio of about 5 to about 500 and a mean average particle diameter of about 10 µm to about 1 millimeter. The oil absorbing material comprises thermoplastic polyolefin material, inorganic filler particles, and absorbent core material. In one embodiment, the sorbent particles can have an average specific surface area of about 0.25 to about 5.0 $m^2/g$ and can have a bulk density that is about 0.01 $g/cm^3$ to about 0.8 $g/cm^3$.

Processes of making the oil absorbing material are also provided. For example, a downsizing process can be utilized to transform absorbent article waste into the oil absorbing material. Generally, the process can include downsizing the absorbent article waste to form sorbent particles at a temperature sufficient to maintain the absorbent article waste, particularly the thermoplastic polyolefin material, in a solid state.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which:

FIG. 1 is a schematic view of an exemplary melt densification apparatus for use according to one embodiment of the present invention;

FIG. 2 is a schematic view of an exemplary SSSP apparatus for use according to one embodiment of the present invention; and FIG. 3 is a schematic view of an exemplary twin screw extruder for use according to one embodiment of the present invention.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, an oil absorbing material including sorbent particles is generally provided. The sorbent particles can have a fibrous and/or flake-like shape such that the particles have a relatively high aspect ratio (i.e., the maximum diameter or width of the particles is greater than the maximum thickness). Additionally, the sorbent particles can have a highly texturized surface with a relatively high porosity. The combination of the flake-like shape, the highly texturized surface, and/or the high porosity of the particles can inhibit the particles from forming a dense, highly packed material. As such, the oil absorbing material can have a relatively low bulk density, which can provide ample void space within and between the particles for absorption of oil. Additionally, the shape and texturized surface can provide a relatively high surface area for absorption of oil.

Though the materials are described as an "oil absorbing material," it should be understood that the material may also be useful for absorbing other hydrophobic fluids. Additionally, the oil absorbing material may be useful in high performance biocomposites, coatings, binder powders, additive formulations, and other products that can take advantage of its structure and composition.

Methods of forming the oil absorbing material from recycled absorbent article waste are also provided. In general, the oil absorbing material can be formed according to a downsizing (i.e., size reduction) process or combination of processes that transforms the absorbent article waste (e.g., manufacturing wastes generated during the production absorbing articles, soiled absorbing articles after their use and disposal; etc.) into the sorbent particles. For example, the recycling process can be used on a fully or partially manufactured absorbent article (e.g., a diaper) that is either rejected for failing to meet manufacturing standards or after use (i.e., a soiled article).

In one embodiment, the fibrous nature of the absorbent article waste, particularly the nonwoven webs of thermoplastic fibers, can be substantially maintained through the downsizing process(es). For example, in one particular embodiment, the absorbent article waste can be transformed into the oil absorbing material that is performed without melting the thermoplastic component of the waste. For instance, the downsizing processes can utilize shear, compression, impact, and other non-thermal mechanisms to downsize the absorbent article waste to the desired particle size.

As explained in greater detail below, the absorbent article waste can be subjected to a series of processes to form the oil absorbing material. In one embodiment, the absorbent article waste can be first subjected to course downsizing to transform the waste into a more processing-friendly state. Optionally, the waste material can then be densified. Finally, the waste material can be further downsized into the oil absorbing material.

I. Absorbent Article Waste

Absorbent article waste is generally transformed into the oil absorbing material according to the recycling process(es) described below. An "absorbent article" generally refers to any article capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, and so forth; medical absorbent articles, such as garments, fenestration materials, underpads, bedpads, bandages, absorbent drapes, and medical wipes; food service wipers; clothing articles; and so forth. Materials and processes suitable for forming such absorbent articles are well known to those skilled in the art. Typically, absorbent articles include a substantially liquid-impermeable layer (e.g., outer cover), a liquid-permeable layer (e.g., bodyside liner, surge layer, etc.), and an absorbent core.

Various absorbent articles at different stages of their manufacture may be used as the absorbent article waste according to the present invention. For purposes of description only, an absorbent article is described as a diaper. However, as noted above, other types of absorbent articles, such as incontinence articles, sanitary napkins, diaper pants, feminine napkins, children's training pants, and so forth may be recycled according to the processes described herein. Generally, the diaper can include a chassis formed by various components, including an outer cover, bodyside liner, absorbent core, and surge layer. The absorbent core can be formed from a composite hydrophilic material formed from various natural or synthetic fibers, wood pulp fibers, regenerated cellulose or cotton fibers, or a blend of pulp and other fibers, superabsorbent material, and the like.

The outer cover is typically formed from a material that is substantially impermeable to liquids, such as from a thin plastic film or other flexible liquid-impermeable material (e.g., polyolefin films, polyolefin films laminated to a nonwoven web, etc.) and may include bicomponent fibers, such as polyethylene/polypropylene bicomponent fibers. The bodyside liner may be formed from a wide variety of materials, such as porous foams, reticulated foams, apertured plastic films, natural fibers (e.g., wood or cotton fibers), synthetic fibers (e.g., polyester or polypropylene fibers), or a combination thereof. In some embodiments, woven and/or nonwoven fabrics are used for the liner (e.g., meltblown and/or spunbonded webs of polyolefin fibers, bonded-carded web of natural and/or synthetic fibers, etc.). The liner may further be composed of a substantially hydrophobic material that is optionally treated with a surfactant or otherwise processed to impart a desired level of wettability and hydrophilicity.

The diaper may also include a surge layer that helps to decelerate and diffuse surges or gushes of liquid that may be rapidly introduced into the absorbent core. The surge layer is typically constructed from highly liquid-permeable materials. Suitable materials may include porous woven materials, porous nonwoven materials, and apertured films. Some examples include, without limitation, flexible porous sheets of polyolefin fibers, such as polypropylene, polyethylene or polyester fibers; webs of spunbonded polypropylene, polyethylene or polyester fibers; webs of rayon fibers; bonded carded webs of synthetic or natural fibers or combinations thereof.

Besides the above-mentioned components, the diaper may also contain various other components as is known in the art. For example, the diaper may also contain a substantially hydrophilic tissue wrapsheet, a ventilation layer positioned between the absorbent core and the outer cover, a pair of ears extending from the side edges of the diaper into one of the waist regions, a pair of containment flaps configured to provide a barrier and to contain the lateral flow of body exudates, various elastic or stretchable materials (e.g., a pair of leg elastic members affixed to the side edges to further prevent leakage of body exudates and to support the absorbent core and a pair of waist elastic members affixed to longitudinally opposed waist edges of the diaper); one or more fasteners, etc.

The various regions and/or components of the diaper may be assembled together using any known attachment mechanism, such as adhesive, ultrasonic, thermal bonds, etc. Suitable adhesives may include, for instance, hot melt adhesives, pressure-sensitive adhesives, and so forth. In the illustrated embodiment, for example, the outer cover and bodyside liner are assembled to each other and to the absorbent core using an adhesive. Similarly, other diaper components, such as the leg elastic members, waist elastic members and fasteners, may also be assembled into the diaper using any attachment mechanism.

When formed from completed absorbent articles (e.g., diapers), the absorbent article waste can generally include about 20% to about 45% by weight thermoplastic polyolefin material, about 1% to about 5% by weight inorganic filler particles, and about 25% to about 65% by weight absorbent core material. For example, the absorbent article waste can be about 20% to about 35% by weight polypropylene based materials, about 3% to about 8% by weight polyethylene based materials (e.g., linear low density polyethylene (LLDPE)), about 1% to about 5% by weight inorganic filler particles (e.g., $CaCO_3$ filler particles, clays, etc.), about 10% to about 35% by weight cellulosic pulp material, about 15% to about 35% by weight superabsorbent material (e.g., superabsorbent acrylic acid based materials), about 2% to about 7% by thermoplastic elastic material (e.g., elastic polyurethanes, elastic polyamides, polyester elastomerics, and the like), and up to about 10% by weight of other materials (e.g., about 5% to about 9% by weight). Other materials can include pigments (e.g., TiO), surfactants, adhesives, thermoset polymers (e.g., thermoset polyurethane polymers can be present in the waste material in the elastic strands of the articles), etc.

In one particular embodiment, the waste material can be stripped into article tailings having most of the absorbent core removed. As used herein, the term "article tailings" refers to an absorbent article having about 3% to about 20% by weight of the absorbent core material (i.e., cellulosic pulp and/or super absorbent materials), such as about 5% to about 15% by weight. This stripping can be especially useful on soiled absorbent articles to remove a majority of the soiled components (i.e., the soiled absorbent core). For example, the article tailings can include about 40% to about 95% by weight of a thermoplastic polyolefin material (e.g., about 40% to about 90% by weight polypropylene and about 5% to about 15% by weight polyethylene), about 2% to about 10% by weight of an thermoplastic elastic material, about 1% to about 10% by weight of an inorganic filler material, and about 1% to about 25% absorbent core material (e.g., about 1% to about 17% by weight of super absorbent material (SAM) and about 0.5% to about 20% by weight polymeric or cellulosic pulp material).

In one embodiment, the absorbent article waste can be subjected to pre-processing treatment(s). For example, when using a soiled absorbent article, the article can be dried and decontaminated. For instance, autoclave treatments utilizing high pressure and temperature can be used to disinfect soiled absorbent articles. Other known techniques can also be used to decontaminate the soiled absorbent articles. However, when using manufacturing waste, no decontamination treatments may be needed.

Since the size reduction recycling process(es) generally preserves the composition of the waste material, the oil absorbing material can, in one particular embodiment, have a substantially identical composition as the inputted waste. However, in other embodiments, additional material may be added to be included in the size reduction process with the waste material to achieve desired properties, such as plasticizers, nucleating agents, acids, peroxides, surface modifiers, compatibilizers, processing aides, and/or polymers such as flow modifiers, block co-polymers, cross-linked rubbers, PE, PP, polyethyleneterephthalate (PET), etc. These additives can be added as a solid or liquid to the extruder along with the waste material.

Additionally, the waste material can be mixed with other post consumer recycle (PCR) waste, virgin plastic materials, rubber waste, and/or other materials that could facilitate the size reduction process and/or add desired properties to the resulting sorbent particles.

II. Downsizing Processes

Generally speaking, the absorbent article waste can be downsized to produce the oil absorbing material of oil sorbent particles. Through this process or combination of processes, the individual components of the absorbent articles do not need to be separated prior to processing. Additionally, the composite mixture of the article waste can be generally preserved.

In one embodiment, the downsizing processes can generally use mechanical forces of sheer, compression, and impact to tear and split apart solid materials into smaller pieces without substantially changing the waste's solid-state. Such downsizing machines can operate by various mechanisms, including, but not limited to, compression, impact, cutting, shearing, or a combination of these mechanisms. Compression generally involves applying mechanical energy to compress particles against a surface and fracture them into smaller particles. Impact mechanisms generally involve high-energy impacts at high speed to fracture the material. Cutting generally involves knives or other cutting tools to slice the material into smaller pieces. Shearing generally involves grinding the material by applying two forces acting in opposite directions along two parallel lines. The mechanism or combination of mechanisms can be selected depending on the waste characteristics and the desired geometries of the resulting particles.

Downsizing can also be accomplished using a combination of thermal and mechanical factors. For example, size reduction can be carried out cryogenically at temperatures well below ambient.

The processes utilized in preparation of the oil absorbing material from absorbent article waste can be categorized into several categories: coarse size reduction, densification, and fine size reduction. Any combination of these processes can be used to achieve the desired oil sorbents.

It is believed that the composite nature of the absorbent article waste, particularly the inclusion of several different incompatible compositions, can contribute to the ability of the waste to be downsized to a sufficient degree. Without wishing to be bound by any particular theory, it is also believed that the presence of inorganic filler material within the absorbent article waste (e.g., $CaCO_3$) can aid in the downsizing of the thermoplastic component and cellulosic components.

A. Course Size Reduction

The absorbent article waste can be first downsized into a course waste shreddings that have a size sufficient to facilitate the further processing (e.g., to facilitate adding the waste to a hopper for further size reduction). While the course waste shreddings can have any suitable size for further processing, the course waste shreddings can in many embodiments have a size of about 0.25 cm to about 3 cm in the maximum width dimension and about 0.5 cm to about 2 cm in the maximum thickness dimension. These course waste shreddings may be easier to further process utilizing subsequent downsizing techniques (or other processing steps).

For example, a conventional scrap chopping machine of the grinder type can be used to form the course waste shreddings, although other machines can be used to this end. One particularly suitable scrap chopping machine is available from Vecoplan, LLC (High Point, N.C.) as a film and fiber "FF" series single-shaft rotary grinders, and those described in U.S. Pat. No. 6,837,453 of Sturm and U.S. Pat. No. 7,168,640 of Lipowski, both of which are incorporated by reference herein. Another exemplary course size reduction machine is available from Cumberland Engineering Corporation (New Berlin, Wis.) as model no. X-1000. Other granulators are described in U.S. Pat. No. 4,932,595 of Cohen, et al. and U.S. Pat. No. 4,000,860 of Gotham, both of which are incorporated by reference herein. Of course, a combination or series of these processes can be utilized to form the course waste shreddings of the desired size.

A screen or other filtering sheet can be used to ensure that the course waste shreddings have been downsized to the desired size. For example, the waste material can be reduced to course waste shreddings having a size of less than 1 inch (i.e., about 2.54 cm), such as about 2 cm to about 2.5 cm, utilizing a screen size of 1 inch to ensure relatively small shredding size of the chopped waste material for further processing. In one embodiment, the waste material can be reduced to a size of less than 0.25 inch (i.e., about 0.6 cm), such as about 0.4 cm to about 0.6 cm) utilizing a screen size of 0.25 inch.

In one particular embodiment, the absorbent article waste can be transformed into the course waste shreddings while maintaining the solid-state of the thermoplastic material. For instance, the course downsizing processes can be performed at temperatures below the melting point of the thermoplastic component of the absorbent article waste.

B. Densification

Optionally, the absorbent article waste (e.g., in the form of course waste shreddings) can be densified prior to subjecting the waste to any fine size reduction process(es). The densification processes can transform the course waste shreddings into pellets or extended filaments can be used as the oil sorbents or can provide the absorbent article waste in a manner that is readily transported and subjected to a fine size reduction process(es). For example, the absorbent article waste can be compressed under pressure into pellets having an average diameter of about 2 mm to about 5 mm (e.g., about 3 mm).

According to these densification processes, the fibrous nature of the absorbent article waste, particularly the nonwoven webs of thermoplastic fibers, can be substantially maintained—at least on the microscopic level—through the densification process(es). For example, the densification processes may be performed at temperatures approaching the melting point of the thermoplastic component of the absorbent article waste, but not exceeding it for a time sufficient to fully melt it. Thus, the thermoplastic component of the absorbent article waste may soften and/or partially melt during the densification process to become tacky and allow for the material to agglomerate into a material with increased density. For example, the absorbent article waste can be heated during densification processes up to about 99% of the melt temperature of the thermoplastic component of the absorbent article waste, such as about 75% to about 95% of the melt temperature of the thermoplastic component.

Though any suitable densification process, or combination of processes, can be utilized, several specific processes are described in greater detail below. For example, in one embodiment, the waste may be first subjected to hot granulation followed by heat shredding densification.

i. Heat Shredding Densification

In one embodiment, the absorbent article waste can be shredded into densified particles. Generally, the course waste shreddings can be fed into a large drum having a spinning blade positioned at the bottom. As the material contacts the blade, it is shredded and heated by the fictional forces acting thereon. As the material continues to be shredded, it heats to a temperature sufficient to soften and/or partially melt the thermoplastic component of the absorbent article waste, causing the material to agglomerate. In one particular embodiment, the temperature of the absorbent article waste can be monitored and controlled during the heat shredding densification to ensure that the thermoplastic component does not completely melt.

FIG. 1 shows an exemplary melt shredding apparatus 10. Waste material can be fed into the hopper 12 to enter the shredding chamber 14. The blade 16 can be rotated around the shaft 18 by motor 20 to shred material. Upon shredding, the material heats up to a temperature sufficient to soften the material. For example, the waste material can be heated through fictional forces resulting from the blade 16 cutting and shredding the material to near the melting temperature of the thermoplastic component. In one embodiment, the temperature of the shredding chamber 14 can be regulated through thermal bands 22 back and be used to heat and/or cool the shredding chamber 14. One particularly suitable hot shredding apparatus is available from Becher Engineering, Inc. (Menasha, Wis.).

Once the material has been shredded to the desired degree, the shredded waste material can be cooled back to room temperature. For example, cooled water (e.g., with a temperature of about 10° C. to about 25° C.) can be added to the shredding chamber 14, and the particles can be collected.

According to this process, the waste material can be shredded into particles ranging from about 0.1 millimeter (mm) to about 25 mm, and in one embodiment about 1 mm to about 20 mm. According to the process, a wide range of particle sizes can be produced, since there is no particle size control mechanism.

ii. Pellet Milling

The pellet milling process utilizes pressure to force the waste material through a die of a predetermined size. As the material passes through the die, it is compacted and/or heated by the pressure forces acting thereon. Through the process, the material's temperature may rise up to or near the melting point of the thermoplastic component to cause the material to soften, through the increase in pressure during the process. In one embodiment, the increase in pressure raises the temperature of the waste material sufficient to soften and/or partially melt the waste material, causing the material to agglomerate for passage through the die. In another embodiment, the temperature of the material may stay relatively low through the pellet milling process, such as about 50% (i.e., about half) or less of the melting temperature of the thermoplastic material in the waste.

As the material passes through the die, a filament is formed having a diameter that corresponds to the diameter of the die. For example, the die can have a diameter of up to about 10 mm, such as about 1 mm to about 5 mm. One particularly suitable pellet milling apparatus is available from Amandus Kahl (Reinbek, Germany).

The pellet milling process can generally provide filament segments having a substantially uniform diameter and shape corresponding to the size and shape of the die. However, the length of the strands may vary as desired. In one particular embodiment, the strands exiting the die generally fracture into smaller filament segments, such as having a length of about 5 mm to about 30 mm (e.g., about 7 to about 15 mm), upon exiting the die.

iii. Hot Granulation

The hot granulation process utilizes pressure to force the waste material through a die of a predetermined size, where a rotating blade cuts the material as it exits the die to form discrete granules. Through the process, the thermoplastic component's temperature rises near its melting point, causing the material to soften with the increase in pressure. As the material passes through the die, it is cut into the particle size as desired. Specifically, the increase in pressure raises the temperature of the waste material sufficient to soften and/or partially melt the waste material, causing the material to conglomerate for passage through the die.

The waste material in the form of course waste shreddings is generally fed into the hot granulator and is cut between stationary and rotating knives as it exits the die. The end product size of the granules can be determined by the size of the holes in the screen. The hot melt granulation process can generally provide granules having a relatively small size distribution.

For example, the waste material can be fed into a feed hopper into an agglomerating chamber, where frictional forces sinter/plasticize the material and press it through the holes of a special die. Agglomeration can occur in a fraction of a second, and right below the melting point of the material.

Material exiting the die is cut by rotating knives and then conveyed (e.g., pneumatically) to into the hot-melt granulator, where it can be further cut between stationary and rotating knives. The end product size of the agglomerates can be determined by the size of the holes in the screen through which the material exits. The agglomerated granules can then be collected.

One particularly suitable hot melt granulator apparatus is available from Pallmann Industries (Clifton, N.J.), such as the Plast-Agglomerator, type PFV, and as disclosed in U.S. Pat. No. 6,469,6738, U.S. Pat. No. 7,467,585 of Pallmann, U.S. Pat. No. 7,311,511 of Pallmann, which are incorporated by reference herein.

iv. Extrusion Densification

The waste material can be densified in an extruder to form extruded filaments and/or pellets, according to processes known in the art of thermoplastic materials. For example, a single screw extruder can be utilized to form extruded pellets of the waste material. Alternatively, a twin screw extruder can be utilized to form extruded pellets of the waste material. Extrusion densification may be performed at temperatures above the melting temperature of the thermoplastic component in the absorbent article waste, to ensure that the thermoplastic component of the waste melts to flow through the extruder. For example, the extrusion temperature can be about 190° C. to about 350° C., such as about 200° C. to about 300° C. This process can provide a high-throughput process that is readily available to those in the art, but may alter and reduce the fibrous structure of the thermoplastic component of the absorbent article waste. As such, the resulting product may have a different morphology than those processes that avoid melting of the thermoplastic component of the absorbent article waste.

C. Fine Size Reduction

The waste material can be downsized into sorbent particles to form the oil absorbing material utilizing a fine size reduction process(es). These fine size reduction processes can transform the waste material, either before or after shredded via a course size reduction process(es) and/or densification process(es), into oil sorbent particles forming the oil absorbency material. Generally, the fine size reduction process can provide sorbent particles having a fibrous and/or flake-like structures with a relatively high aspect ratio and/or relatively narrow particle size distribution. Additionally, the fine size reduction process can form these particles with highly texturized surfaces and with relatively high void space and/or porosity. The combination of the flake-like shape, the highly texturized surface, and/or the high porosity of the particles can inhibit the particles from forming a dense, highly packed material. As such, the oil absorbing material can have a relatively low bulk density, which can provide ample void space within and between the particles for absorption of oil. Additionally, the shape and texturized surface can provide a relatively high surface area for absorption of oil.

Though any suitable fine size reduction process can be utilized, several specific processes are described in greater detail below. In one embodiment, the fine size reduction process can be performed at temperatures below the melting temperature of the thermoplastic material within the absorbent article waste, in order to somewhat preserve the solid-state characteristics of the waste material as supplied to the fine size reduction process. For example, the absorbent article waste can be heated during the fine size reduction processes up to about 75% of the melt temperature of the thermoplastic component of the absorbent article waste, such as about 25% to about 60% of the melt temperature of the thermoplastic component.

In addition, the sorbent particles produced from the fine size reduction process(es) can be subjected to further processing, as desired. Such further treatments can further reduce particle size, change the particle shape, modify the particle surface, change the color of the particles, blended with polymeric materials, etc.

i. Impact Downsizing

The absorbent article waste can be subjected to impact and shear forces to reduce the waste to particles having the desired size. According to one embodiment of impact downsizing, the waste material is downsized utilizing a grinder utilizing a rotating grinding element. For example, repeated impact and/or shear stress can be created between a rotating grinding element and a stationary or counter-rotating grinding element. Additional impact and shear forces can be applied to the waste through impact of the waste particles with each other within the system.

Impact downsizing can utilize air flow to carry and collide the waste particles into a grinding disk (or other shearing element). The flow of air can be sufficient not only to carry the waste particles, but also to cool the material as shear and impact forces may increase the temperature of the material. Additionally, the air flow can cause the waste particles to collide with each other, particularly when utilizing a cylindrical grinding chamber.

One particularly suitable impact downsizing apparatus is available commercially from Pallmann Industries (Clifton, N.J.) under the name Turbofiner®, type PLM. In this apparatus, a high activity air whirl is created within a cylindrical grinding chamber between a stationary grinding element and a rotating grinding element of an impact grinding mill. Due to the high air volume, particles are impacted against each other and become downsized. An internal classifier (e.g., a screen) rejects coarse material, which is fed back into the grinding chamber, where as the particles with the target size can be collected. Through this process, the thermoplastic component of the absorbent article waste can stay cool, and well below its melting temperature.

Other suitable impact downsizing apparatus are described in U.S. Pat. No. 6,431,477 of Pallmann and U.S. Pat. No. 7,510,133 of Pallmann, both of which are incorporated by reference herein.

ii. Cold Extrusion Downsizing

Cold extrusion downsizing can utilize shear and compression forces to downsize the absorbent article waste into the sorbent particles. Cold extrusion downsizing processes can utilize typical extrusion equipment, known to those skilled in the processing of plastics. In particular, the waste material can be forced through a die at temperatures below the melting point of the thermoplastic component of the absorbent article waste. However, during the cold extrusion process, the absorbent article waste may increase in temperature due to the compression and shear forces acting thereon.

For example, the cold extrusion downsizing process can be carried out at a temperature of less than about 100° C., such as about 35° C. to about 75° C., and particularly about 40° C. to about 50° C. At these temperatures, the thermoplastic component of the absorbent article waste does not melt, substantially preserving its fibrous nature.

Although a single screw extruder may be utilized, in one particular embodiment, a twin screw extruder is utilized to form the sorbent particles of the oil absorbing material. Twin screw extruders can have co-rotating or counter-rotating, intermeshing or non intermeshing screws that can create a high shear, high intensity mixing action for increased downsizing of the absorbent article waste. In addition, the configurations of the screws themselves may be varied using forward conveying elements, reverse conveying elements, kneading blocks, and other designs in order to achieve particular mixing characteristics. Thus, the flexibility of twin screw extrusion equipment allows for specific tailoring of the process according to the desired product configuration.

FIG. 3 shows an exemplary diagram of a twin screw extruder 130 including a first screw 132 and a second screw 134. The first screw 132 and second screw 134 are shown to have intermeshing elements 133 and 135, respectively, that can applied shear forces to the waste material within the extruder 130. Although shown as counter-rotating, with the first screw 132 and the second screw 134 rotating in opposite directions, the screws 132, 134 can be configured to rotating in the same direction (i.e., co-rotating). Additionally, the speed of rotation of the two screws can be independently controlled to adjust the amount of shear forces. As the material moves through the extruder 130, it is sheared by the movement of the screws 132, 134 and can exit via the die 136. In one embodiment, side walls 138 of the extruder 130 can be thermally controlled (e.g., cooled) to ensure the waste material within the extruder 130 remains below the melting temperature of the thermoplastic component of the absorbent article waste.

Exemplary twin screw extruders include, but are not limited to, those available commercially under the names Brabender® D-6 (C.W. Brabender® Industries, Inc. of South Hackensack, N.J.), Prism USALAB 16 Twin Screw Extruder (Thermo Electron Corp., Stone, England) and the ZSK series of twin screw extruders (Coperion Corp., Ramsey, N.J.; formally Werner and Pfleiderer Corporation).

iii. Solid-State Shear Pulverization Downsizing

A solid-state shear pulverization (SSSP) recycling process can be used to convert absorbent articles and/or article tailings into the oil absorbing material. In general, the SSSP recycling process increases the specific surface area of waste material into the flake powder having a smaller size. SSSP recycling processes, due to the shearing and tearing mechanisms, can provide particles that have a plate-like, anisotropic structure and relatively narrow particle size distribution. Additionally, the fibrous structure of the source material (e.g., the absorbent article tailings) can be at least partially preserved as material is not undergoing melting during the SSSP recycling process. For example, the SSSP recycling process uses shearing and tearing forces that preserve the fibrous structure of the absorbent article waste while allowing for more elongated and plate-like downsized particulate material.

The absorbent article waste is generally subjected to a SSSP recycling process that pulverizes the waste into the sorbent particles without melting the materials. As such, certain structural features of the waste can be preserved in the SSSP process. The solid-state shear pulverization recycling process generally utilizes a continuous extrusion process carried out under high shear and compression conditions while the extruder barrels and a screw are cooled to prevent polymer melting.

Referring to FIG. 2, an exemplary SSSP extruder 100 is generally shown. The waste can be fed into the extruder 100 at the feeder 102. Twin screws 104 (only one shown) defining threads 105 are rotated by motor 106 to pulverize the shreddings while they move through the extruder barrel 108 towards the exit 110. The exit 110 is generally a die-less exit in order to preserve the particle shape and density formed within the extruder 100.

The extruder 100 generally includes side-by-side, intermeshing, co-rotating screws 104 (only one shown in FIG. 2) in the extrusion barrel 108. However, it is understood that one or more extruder screws 104 can be utilized to achieve solid-state shear pulverization. When multiple screws are present, the screws 104 are generally rotated in the same direction by drive motor 106 (or motors) to transport the shreddings towards the exit 110. The screws 104 can be modified by selection of appropriate transport elements, kneading or shearing elements, and spacer elements and their sequential arrangement and element lengths along the axis of the screw shaft. For example, extruders 100 and/or screws 104, along with their related SSSP processes, are disclosed in U.S. Pat. No. 5,814,673 of Khait; U.S. Pat. No. 6,479,003 of Furgiuele, et al.; U.S. Pat. No. 6,494,390 of Khait, et al.; U.S. Pat. No. 6,818,173 of Khait; and U.S. Publ. No. 2006/0178465 of Torkelson, et al., all of which are incorporated herein by reference.

In one embodiment, the screws 104 can define conveying sections within the barrel 108 to transport the waste within the extruder 100 and pressurizing/kneading sections to increase pressure in the compacted waste material and to pulverize the waste by transforming a potential energy accumulated during the process into surface energy of the pulverized particles. For example, the conveying sections can be positioned between the pressurizing and kneading sections to tumble the material within the extruder 100 to maintain sufficient heat transfer conditions (i.e., for cooling the waste material to inhibit melting of the material within the extruder 100).

The SSSP process is performed while subjecting the material to temperature and pressure conditions effective to achieve solid state shear pulverization thereof (without melting of the polymers). Since the pressures and shearing process within the barrel 108 can create heat through friction forces, etc., cooling chambers 112 are present about the extruder barrel 108 to cool the material during the solid state pulverization process to avoid melting. However, softening of one or more of the polymers may occur during the process.

In general, the extruder barrel 108 can be cooled to ensure that the material within the barrel 108 does not exceed the melting point of the polymeric material. For example, the barrels 108 can be cooled by the cooling chambers 112 to about 10° C. or less during the solid state pulverization process, such as about −50° C. to about 0° C. By keeping the temperature below its melting point and/or glass transition temperature, the polymeric structure (e.g., polymeric fibers) and/or crystallinity, respectively, can be generally preserved while being pulverized.

For example, the solid state shear pulverization extruder 100 can include the twin-screw extruder manufactured by Hermann Berstorff Maschinenbau GmbH (Hanover, Germany) as model ZE 40A (L/D 40.5). The ZE 40A twin-screw extruder includes twin, side-by-side intermeshing screws having a modular construction wherein each screw includes a series of standard screw elements mounted end-to-end in a selected sequence on a continuous screw shaft. The screw elements or stages include fluted transport elements, kneading or shearing elements, and spacer elements mounted in a selected sequence on the continuous shaft to accommodate variations in pulverization parameters and material compositions, as necessary.

The particulate composition produced by the SSSP process can flow out of the extruder 100 through the exit 110. In one particular embodiment, the particulate composition can be discharged through exit 110 at zero pressure to avoid any compaction and/or agglomeration of the particles.

iv. Cryogenic Disk Milling Process

The cryogenic disk milling process generally uses liquid nitrogen to cool (e.g., freeze) the thermoplastic material of the absorbent article waste prior to and/or during a variety of grinding mechanisms. The systems can be configured in multiple ways in order to tailor the final powder distribution depending on the application. In one embodiment, a single-runner disk milling apparatus can be utilized. The single-runner disk milling apparatus has a stationary disk and a rotating disk. Material enters between the discs via a channel near the disk center. The material is size reduced through the frictional forces created between the discs as the discs rub against each other. The top size of the particles can be determined by material having to pass through a screen with a specified mesh size in order to exit a discharge port. Suitable mesh sizes can be about 5 to about 75, such as about 25 to about 60. For example, one suitable cryogenic disk milling apparatus is available under the name Wedco® cryogenic grinding system from ICO Polymers (Allentown, Pa.).

The cyrogentic disk milling process can produce more rounded, less fibrous structures due to the brittle fracturing that occurs at the freezing temperatures of the process, instead of shearing forces. Thus, the resulting particles may have less fibrous structures that have a higher bulk density than achieved through other fine size reduction processes, which could compromise the oil absorption properties of the product.

III. Oil Absorbing Material

Since the oil absorbing material is formed from absorbent article waste, the composition of the waste can include a combination of thermoplastic polymeric material (e.g., polyolefins), cellulosic materials (e.g., pulp), superabsorbent materials, and other components (e.g., adhesives, binders, elastics, etc.). However, due to their relatively small size, the sorbent particles of the oil absorbing material can have varying composition from particle to particle.

The overall composition of the oil absorbing material can generally correspond to the absorbent article waste utilized as the starting material, but will generally include a thermoplastic component, inorganic filler particles (e.g., $CaCO_3$), and absorbent core material (e.g., cellulosic material, superabsorbent material, or mixtures thereof). The thermoplastic component can include thermoplastic polyolefin material (e.g., polypropylene, polyethylene, or mixtures or copolymers thereof), as well as other thermoplastic materials present in the waste.

For example, when formed from complete absorbent articles (e.g., manufactured diapers rejected for any reason and/or soiled diapers, etc.), the oil absorbing material can include about 20% to about 45% by weight thermoplastic polyolefin material, about 1% to about 5% by weight inorganic filler particles, and about 25% to about 65% by weight absorbent core material. In particular embodiments, the oil absorbing material can include about 20% to about 35% by weight polypropylene, about 3% to about 8% by weight polyethylene, about 1% to about 5% by weight inorganic filler particles, about 25% to about 65% by weight absorbent core material. The absorbent core material can include cellulosic material and superabsorbent material such that the oil absorbing material comprises about 15% to about 35% by weight of the super absorbent material and about 10% to about 30% by weight cellulosic material.

Alternatively, when formed from article tailings, the oil absorbing material can include about 45% to about 85% by weight thermoplastic polyolefin material, about 1% to about 10% by weight of an inorganic filler material, and about 1% to about 25% of absorbent core material. In particular embodiments, the oil absorbing material can include about 40% to about 70% by weight polypropylene, about 5% to about 15% by weight polyethylene, about 1% to about 10% by weight of an inorganic filler material, and about 1% to about 25% of absorbent core material. The absorbent core material can include cellulosic material and superabsorbent material such that the oil absorbing material comprises about 1% to about 17% by weight of the super absorbent material and about 0.5% to about 10% by weight cellulosic material.

In addition to the overall composition of the oil absorbing material, the size, shape, surface area, bulk, and other physical characteristics of the sorbent particles can increase its affinity for oil absorption. In some embodiments, a fibrous or plate-like structure can be achieved for creating services suitable for oil wicking. In addition, high aspect ratio of the particles and/or narrow particle size distribution can provide increased void spaces and porosity to increase oil wicking. Particle size and asking also be achieved to facilitate, or prevent, aggregation of the particles. For example, aggregation can be minimized by using resilient and tangled fibrous materials.

For example, the downsizing process(es) can preserve the structural characteristics of the absorbent article waste (e.g., the fibrous nature of the material can be preserved) and the inherent properties of virgin materials constituting the waste while transforming the waste into sorbent particles having a particle size and shape attractive for oil absorption.

For example, the sorbent particles can be generally described as flake-like particulates in that the particles possess a relatively flat shape. The degree of flatness of the sorbent particles is generally defined by the "aspect ratio", i.e., the maximum diameter or width of the particles divided by the maximum thickness ("D/T"). That is, flat particles will have an aspect ratio that is higher than spherical particles. The powder used in the present invention typically has an aspect ratio of about 5 to about 500, in some embodiments about 10 to about 400, and in some embodiments, about 20 to about 350.

As stated, the sorbent particles can have a relatively small particle size. For example, the sorbent particles can have a mean average particle diameter that is about 10 microns ($\mu m$) to about 2 millimeters (mm), such as about 50 $\mu m$ to about 1 mm. In one particular embodiment, the sorbent particles can have a mean average particle diameter that is less than about 100 microns ($\mu m$) to about 800 $\mu m$. While the particle size can vary from particle to particle within the oil absorbing material, the mean average particle diameter can be about 300 $\mu m$ to about 700 $\mu m$.

By preserving the structural features of the absorbent article waste (e.g., nonwoven webs of fibers), the sorbent particles can define a plurality of open void spaces, creating a relatively highly texturized surface and relatively low bulk density. For example, the sorbent particles can have a dry bulk density (prior to oil absorption) that is about 0.01 grams per cubic centimeter ($g/cm^3$) to about 0.8 $g/cm^3$, in some embodiments from about 0.05 $g/cm^3$ to about 0.5 $g/cm^3$, and in some embodiments, from about 0.05 $g/cm^3$ to about 0.2 $g/cm^3$.

The relatively small size of the sorbent particles can also allow for a relatively high surface area for absorbing oil. For instance, the sorbent particles can have a specific surface area of about 0.25 to about 5.0 $m^2/g$, in some embodiments from about 0.3 to about 2.0 $m^2/g$, and in some embodiments, from about 0.4 to about 2.0 $m^2/g$.

The oil absorbency (e.g., gram of oil per gram of material, abbreviated g/g) can depend on several variables, including the material bulk density, particle shape, material composition, void space, etc., along with the type of oil to be absorbed.

In certain embodiments, the oil absorbency for AW32 hydraulic oil may be greater than about 2 g/g, such as about 3 g/g to about 15 g/g (e.g., about 4 g/g to about 12 g/g).

The present invention may be better understood with reference to the following examples.

EXAMPLES

Materials:

The "diaper manufacturing waste" was produced at the Beech Island Mill (Beech Island, S.C.) of Kimberly-Clark, Inc. The diaper manufacturing waste was composed of manufacturing defects and/or machine start-up products where the majority of the absorbent structure has been removed.

The "shredded diaper manufacturing waste" was produced by shredding and granulation of cut diaper tailing waste collected and baled from the Beech Island Mill (Beech Island, S.C.) of Kimberly-Clark, Inc. First the baled waste was sent to Vecoplan LLC (Highpoint, N.C.) for shredding and granulation. First, the baled waste was shredded using a film and fiber "FF" series single-shaft rotary grinder (Vecoplan LLC). After shredding step, the shredded material was granulated using model X-1000 from Cumberland Engineering Corporation (New Berlin, Wis.). The combination of shredding and granulation reduced the diaper tailing waste from about 1-3 inch pieces to about ¼ inch uniform fluff.

The "pelletized diaper waste material" was produced by extrusion through a PRISM Usalab 16 twin-screw extruder. The ¼ inch uniform fluff was hand fed into the feed throat and extruded at a screw speed of 600 rpm and set temperature of 180° C.

The "polypropylene material" was purchased under the name Pro-fax® SV954 from Basell Polyolefins Company.

The "polyethylene material" was purchased under the name Dowlex LLDPE 2047G from Dow Plastics Pellet.

Example 1A

Cold Extrusion Downsizing

Cold extrusion downsizing through the mechanisms of shear and tearing was performed on shredded diaper manufacturing waste using a lab scale Thermo Prism Usalab 16 twin screw extruder having a L/D of 40:1 with material being introduced into extruder at feed zone followed by 9 thermocouple control zones and absent die system to allow ease of material exit. Screw configuration included forward conveying at feed zone through zone 1, mixing elements at zone 2, forward conveying at zone 3, mixing elements followed by reverse conveying element at zone 4, conveying elements at zones 5 and 6, mixing elements at zone 7, finally zones 8 and 9 composed of forward conveying elements. Extruder temperature conditions involved heating elements set to off to start the extrusion process at ambient temperature (e.g., about 20-25° C.). The screw speed was set at 100 rpm. Feed rate was variable and determined by % torque: when torque reach 80%, feeding was stopped until torque levels lowered down to 60% then feeding was resumed. The temperature of the extruder steadily increased during processing with the highest temperature reaching 80° C. located at high shear mixing zone (zone 4). Small powder samples were collected.

Example 1B

Cold Extrusion Downsizing

The same cold extrusion process was carried out on shredded diaper manufacturing waste after the waste had been pelletized through a densification process. Densification of the shredded diaper manufacturing waste was accomplished by extrusion through a PRISM Usalab 16 twin-screw extruder. The ¼ inch uniform fluff was hand fed into the feed throat and extruded at a screw speed of 600 rpm and set temperature of 180° C.

Example 2A

Impact Downsizing

Impact downsizing of the diaper manufacturing waste was performed using a Turbofiner® PLM process (Pallmann Industries, Inc.). Prior to sending the diaper manufacturing waste through the PLM process, the diaper manufacturing waste was run through a vertical separator air stream to remove additional absorbent material. In the vertical separator, the larger plastic portions fall through the air stream while the smaller absorbent material particles are taken up by the air stream and deposited into a filter bag for collection. The plastic portion of the diaper manufacturing waste was then shredded using a granulator (Pallmann PS knife mill). The shredded diaper manufacturing waste was then agglomerated into particles using a Pallmann PFV plast Agglomerator. The PFV was setup with a 4 mm die. After the PFV process the particles were sent to a hot melt granulator with an 8 mm screen to be uniformly sized. Particles from the granulator were then processed through the PLM turbofiner. In the PLM, the agglomerated particles were crammed into the grinding chamber with a screw feeder. In the grinding chamber, the agglomerated particles are passed between stationary and rotating grinding plates at fixed gap of 3 mm where the impact of the particles occurred.

Example 2B

Impact Downsizing

The same process as in example 2A was performed, except that the vertical separator process was not used to remove absorbent material from the diaper manufacturing waste.

Example 3

SSSP

Size reduction of material was achieved via solid state shear pulverization on a modified lab scale twin screw extruder located at Northwestern University in Evanston, Ill. Modification of the extruder included addition of higher torque motor and barrel cooling system. Barrel cooling was achieved via passage of glycol solution through barrels which cycles through a heat exchanger. Extruder profile involves material entering at feed port (zone 1) followed by 5 temperature zones. Zones 2-4 have barrel cooling system, zone 5 (also called measuring disk) is absent of cooling system, followed by zone 6 with barrel cooling system, with end of extruder absent die system to allow ease of material exit. Minimum barrel temperature that can be achieved is −4° C. General screw configuration typically involves forward conveying at zones 1, kneading elements at zone 2, forward conveying elements at zones 3 and 4, with combinations of forward and reversers kneading elements at zones 5 and 6, with final element being a forward conveying element.

To achieve size reduction of material via SSSP, material was crammed at feed zone 1 at a set feed rate, with extruder screw at a set rpm. Process conditions such as motor AMP, KC, % load (torque), and barrel temperature were monitored to prevent overheating and over torquing of extruder. Once process conditions were stable and material throughput reached steady state, material was collected and process conditions were recorded. Throughputs ranged from 38 g/hr to 1350 g/hr, screw rpm ranged from 50-400, % load ranged from 20-40%, barrel temperature ranged −4° C. to 77° C.

Example 4

Mixed PP Staple Fibers and SSSP Material

The material formed according to Example 3 was mixed with crimped polypropylene staple fibers (PP T198 Hydrophobic) to create a composite fluff. To facilitate blending, the staple fibers were first downsized from their original lengths of 1⅞" to a maximum length of ¼" using a Hudson Machinery SE25 clicker press and ¼" die. Then, using a custom-built 3" circular handsheet former (commonly used to blend SAM with cellulosic fluff to make trial absorbent cores), a composite fluff was made consisting of 25 wt % staple fiber fines and 75 wt % powder (either SSSP or cryogenic grinding). The staple fibers and powder components were added simultaneously into the handsheet former vortex, where they were mixed via alternating forced air and vacuum, and finally vacuum collected on a mesh sieve tray residing underneath the vortex.

Example 5

Granulated

The diaper manufacturing waste was run through a vertical separator air stream to remove additional absorbent material. In the vertical separator, the larger plastic portions fall through the air stream while the smaller absorbent material particles are taken up by the air stream and deposited into a filter bag for collection. The plastic portion of the diaper manufacturing waste was then shredded using a Pallmann PS knife mill granulator.

Comparative Example 1

Cold Extrusion Downsizing of PE

The procedure of Example 1 was carried out on neat polyethylene (PE) purchased from The Dow Chemical Company (Midland, Mich.) under the name Dowlex 2047G.

Comparative Example 2

Cryogenic Disk Mill Downsizing

The shredded diaper manufacturing waste was densified by a heat granulation process in a hot shredding apparatus available from Becher Engineering, Inc. (Menasha, Wis.). Materials were manually crammed into a large drum with a spinning blade at the bottom. As the material contacts the blade it is shredded and heated by friction. As the material continues to be shredded it heats up and partially melted material begins to stick together. Once the fibrous material was no longer visible to the naked eye, water was used to cool the resulting polymer chunks. The chunks varied in size with particles that range from about 1 mm to about 20 mm in average diameter.

Cryogenic disk mill downsizing was achieved via WEDCO® cryogenic grinding systems at ICO Polymers located in Allentown, Pa. Material was cooled utilizing liquid nitrogen cooling system and conveyed to disk milling for size reduction. A single-runner disk mill was utilized which is described as have a stationary disc and one rotating disc. Material entered between the discs via a channel near the disk center. The material was size reduced between the discs as the discs rub against each other. Top size of particles is determined by material having to pass through a screen with specified mesh size in order to exit discharge port. Three samples were generated with each having a different top size of 10, or 60 mesh, respectively.

Comparative Example 3

PE Powder

Ultra high molecular weight polyethylene material was received from Sigma Aldrich.

Observations:

Microscopy of SSSP particles and cryogenically milled particles were examined by scanning electron microscopy (SEM). All samples were sputter coated with gold and imaged in a JEOL 6490LV SEM at high vacuum with 2.5 kV electron beam.

The cryogenically milled particles were considerably larger than SSSP particles. Additionally, the cryogenically milled sample (comparative example 2) contained very few free fiber or fiber fragments compared to SSSP (example 3). While fibers are clearly present within the individual particles they rarely project much beyond the particle surface, likely having been fractured or broken off during the cold milling process. The cryogenically milled particles also feature evidence of glassy fracture and have tiny hairline cracks visible at higher magnifications. The particles have holes and cavities, giving a swiss-cheese like appearance.

Dry bulk density of produced materials was estimated to assess differences in porosity and the dependence of bulk density on mechanism of downsizing. Into a tared 26 mL vial was added powder so as not to disturb how the powders pack. Excess powder was leveled off with a straight edge and the weight was taken. Weight divided by 26 to get bulk density in g/mL. For staple fibers or larger material such as densified diaper tailings, bulk density was determined by placing material into a tared 500 mL beaker to 300 mL marker and weighting. Weight divided by 300 mL to get bulk density in g/mL. Dry bulk density of the tested materials can be found in Table 1:

TABLE 1

| Sample | Sample form | Dry Bulk Density (g/mL) | Oil sorb g/g | Inverse of Dry Bulk Density (mL/g) |
|---|---|---|---|---|
| Example 1A | flake | 0.11 | 3.325 | 9.1 |
| Example 1B | powder | 0.122 | 3.6 | 8.2 |
| Example 2A | flake | 0.192 | 4.09 | 5.2 |
| Example 2B | flake | 0.163 | 4.08 | 6.1 |
| Example 4 | fiber-powder hybrid | 0.032 | 11.625 | 31.3 |
| Example 5 | Fluff | 0.044 | 11.64 | 22.7 |
| Comparative Example 1 | flake | 0.11 | 5.9 | 9.1 |
| Comparative Example 2 | powder | 0.275 | 1.35 | 3.6 |
| Comparative Example 3 | powder | 0.429 | 1.55 | 2.3 |

The void space of the material can be estimated by utilizing the inverse of the dry bulk density (mL/g).

Active SAM content was estimated through measurement of the amount of water absorbed by the polymer mixes. Dry samples were weighed and place in a beaker with excess distilled water. The beakers were then placed on a stir plate and mixed for 20 minutes to allow complete absorption of water by the active SAM particles. Upon completion, the remaining water and polymer mixture was poured from the beaker into a fine cloth bag pervious to water but impassible by the polymer powders. The bags were then sealed and placed in a centrifugal spinner to remove all unabsorbed water content of the polymer blends. The remaining contents were then weighed and compared to original dry weights of the powders. Assuming SAM absorbs 100 g H20 per 1 g SAM, and that all retained water was due to SAM absorption, the % active SAM content of the powders were determined by subtracting the dry powder weight from the wet powder, and dividing the resulting value from the original dry powder weight: (Wet−Dry)/Dry.

It was found that the level of active SAM starting in the granulated tails was approximately 5% and as the process undergoes densification (Becher Densified), the polymeric materials begin to flow and entrap or coat the SAM rendering it inactive. As the material undergoes size reduction via the SSSP process, the amount of active SAM was relatively unchanged. The shearing/tearing mechanism experienced in SSSP helps to keep the SAM particles entrapped. However, during the cryogenic disk milling where the size reduction is accomplished via impact, more SAM is freed from the densified material resulting in nearly the same level of Active SAM as originally present in the granulated tailings.

The materials were tested to evaluate their potential for oil absorption using a static test for oil sorbent. The method of testing the oil absorption was as follows: (1) weigh material (dry weight) to achieve 16 grams, (2) place the weighed material in a 200 mesh sieve shaker pan, (3) Material and Pan were then submerged in a container of oil (although both a 10W-30 standard motor oil and a AW32 hydraulic oil were tested, the results shown in Table 1 were measured using the AW32 hydraulic oil), (4) after 15 minutes the material and Pan were taken out of container of oil, (5) the material and pan were drained for 5 minutes, (6) after 5 minutes the material and pan were weighed, (7) the weight of the pre-weighed material (16 grams) and oil saturated 200 mesh sieve shaker pan (386.01 grams) were subtracted to give the grams of oil absorbed, (8) the grams absorbed was divided by 16 grams (original dry weight) to obtain grams absorbed per gram of material.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A process for transforming absorbent article waste into an oil absorbing material, the process comprising: downsizing absorbent article waste to form sorbent particles, wherein the absorbent article waste comprises thermoplastic polyolefin material, inorganic filler particles, and absorbent core material, wherein downsizing is achieved at a temperature sufficient to maintain the thermoplastic polyolefin material in a solid state, wherein the sorbent particles have an average aspect ratio of about 5 to about 500 and a mean average particle diameter of about 10 µm to about 1 millimeter.

2. The process as in claim 1, further comprising: shredding the absorbent article waste into waste shreddings prior to downsizing.

3. The process as in claim 2, wherein the waste shreddings have a size of about 0.25 cm to about 3 cm in the maximum width dimension and about 0.5 cm to about 2 cm in the maximum thickness dimension.

4. The process as in claim 1, wherein the absorbent article waste comprises article tailings.

5. The process as in claim 4, wherein the absorbent article waste comprises about 45% to about 85% by weight thermoplastic polyolefin material, about 1% to about 10% by weight of an inorganic filler material, and about 1% to about 25% of absorbent core material.

6. The process as in claim 5, wherein the absorbent article waste comprises about 40% to about 70% by weight polypropylene, about 5% to about 15% by weight polyethylene, about 1% to about 10% by weight of an inorganic filler material, and about 1% to about 25% of absorbent core material.

7. The process as in claim 5, wherein the absorbent core material comprises cellulosic material and superabsorbent material such that the oil absorbing material comprises about 1% to about 17% by weight of the super absorbent material and about 0.5% to about 10% by weight cellulosic material.

8. The process as in claim 1, wherein the absorbent article waste comprises diapers.

9. The process as in claim 8, wherein the absorbent article waste comprises about 20% to about 45% by weight thermoplastic polyolefin material, about 1% to about 5% by weight inorganic filler particles, and about 25% to about 65% by weight absorbent core material.

10. The process as in claim 9, wherein the absorbent article waste comprises about 20% to about 35% by weight polypropylene, about 3% to about 8% by weight polyethylene, about 1% to about 5% by weight inorganic filler particles, and about 25% to about 65% by weight absorbent core material.

11. The process as in claim 9, wherein the absorbent core material comprises cellulosic material and superabsorbent material such that the oil absorbing material comprises about 15% to about 35% by weight of the super absorbent material and about 10% to about 30% by weight cellulosic material.

12. The process as in claim 1, wherein the absorbent article waste is downsized by a twin-screw extruder.

13. The process as in claim 12, wherein the twin-screw extruder is housed within an extruder barrel, wherein the extruder barrel is cooled during downsizing.

* * * * *